US011322141B2

(12) United States Patent
Okuda et al.

(10) Patent No.: US 11,322,141 B2
(45) Date of Patent: May 3, 2022

(54) INFORMATION PROCESSING DEVICE AND INFORMATION PROCESSING METHOD

(71) Applicant: SONY CORPORATION, Tokyo (JP)

(72) Inventors: Takao Okuda, Tokyo (JP); Takashi Shibuya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 123 days.

(21) Appl. No.: 16/635,281

(22) PCT Filed: Aug. 3, 2018

(86) PCT No.: PCT/JP2018/029178
§ 371 (c)(1),
(2) Date: Jan. 30, 2020

(87) PCT Pub. No.: WO2019/035371
PCT Pub. Date: Feb. 21, 2019

(65) Prior Publication Data
US 2020/0372910 A1 Nov. 26, 2020

(30) Foreign Application Priority Data
Aug. 17, 2017 (JP) .............................. JP2017-157538

(51) Int. Cl.
*G10L 21/00* (2013.01)
*G10L 19/00* (2013.01)
(Continued)

(52) U.S. Cl.
CPC .............. *G10L 15/22* (2013.01); *G06F 40/30* (2020.01); *G10L 15/30* (2013.01)

(58) Field of Classification Search
None
See application file for complete search history.

(56) References Cited

U.S. PATENT DOCUMENTS 7,409,344 B2 * 8/2008 Gurram ................... G06F 3/167
704/251
2008/0275937 A1 11/2008 Nishiki
(Continued)

FOREIGN PATENT DOCUMENTS

| CN | 103020102 A | 4/2013 |
|----|-------------|--------|
| CN | 104508739 A | 4/2015 |

(Continued)

OTHER PUBLICATIONS

International Search Report and Written Opinion of PCT Application No. PCT/JP2018/029178, dated Sep. 18, 2018, 09 pages of ISRWO.

(Continued)

*Primary Examiner* — Satwant K Singh
(74) *Attorney, Agent, or Firm* — Chip Law Group

(57) ABSTRACT

An information processing device includes a communication controller that performs communication control for receiving transmission data transmitted from a client, transmitting the transmission data to a first service providing server that performs a first service process, receiving a first service process result from the first service providing server, transmitting data according to the first service process result to a second service providing server that performs a second service process that is different from a first service, receiving a second service process result from the second service providing server, and transmitting the second service process result to the client. The first service process result is obtained by performing the first service process on the transmission data. The second service process result is obtained by performing the second service process on the data according to the first service process result.

6 Claims, 13 Drawing Sheets

(51) Int. Cl.
  *G10L 15/22* (2006.01)
  *G06F 40/30* (2020.01)
  *G10L 15/30* (2013.01)

(56) References Cited

U.S. PATENT DOCUMENTS

| | | |
|---|---|---|
| 2013/0080056 A1 | 3/2013 | Homma et al. |
| 2013/0346077 A1 | 12/2013 | Mengibar et al. |
| 2014/0214410 A1 | 7/2014 | Jang et al. |
| 2015/0032374 A1* | 1/2015 | Homma ............... G01C 21/00 701/537 |
| 2015/0254334 A1 | 9/2015 | Mengibar et al. |
| 2015/0348548 A1 | 12/2015 | Piernot et al. |
| 2016/0140218 A1 | 5/2016 | Moreno Mengibar et al. |
| 2016/0342682 A1 | 11/2016 | Moreno Mengibar et al. |
| 2020/0105258 A1* | 4/2020 | Lin ....................... G10L 15/005 |
| 2020/0105259 A1* | 4/2020 | Lin ................. H04N 21/47202 |

FOREIGN PATENT DOCUMENTS

| | | |
|---|---|---|
| CN | 107845382 A | 3/2018 |
| EP | 2581901 A2 | 4/2013 |
| EP | 2864981 A2 | 4/2015 |
| JP | 2002-024212 A2 | 1/2002 |
| JP | 2008-276387 A | 11/2008 |
| JP | 2013-068532 A | 4/2013 |
| JP | 2014-134675 A | 7/2014 |
| JP | 2015-081971 A | 4/2015 |
| JP | 2015-526797 A | 9/2015 |
| JP | 2015-200860 A | 11/2015 |
| KR | 10-2015-0031309 A | 3/2015 |
| WO | 2013/192218 A2 | 12/2013 |

OTHER PUBLICATIONS

Office Action for EP Patent Application No. 18845663.6 dated Jun. 28, 2021, 33 pages of Office Action.

\* cited by examiner

[FIG. 1]
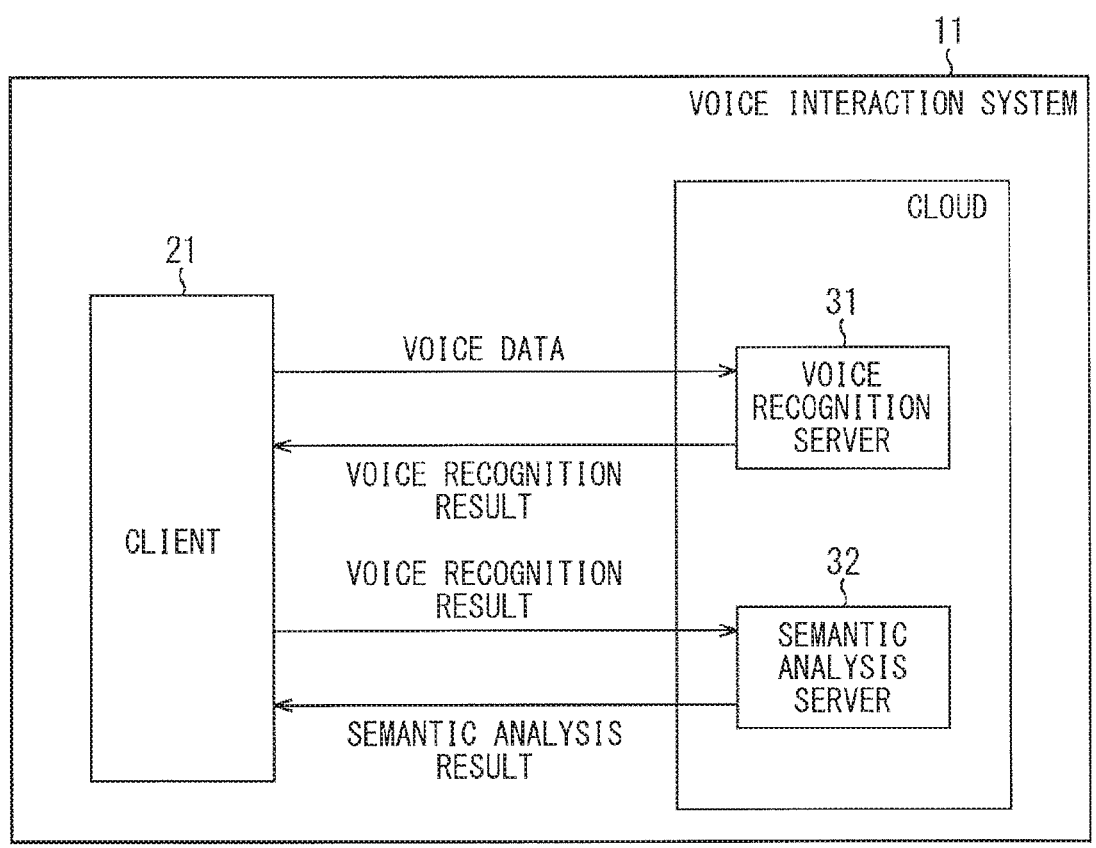

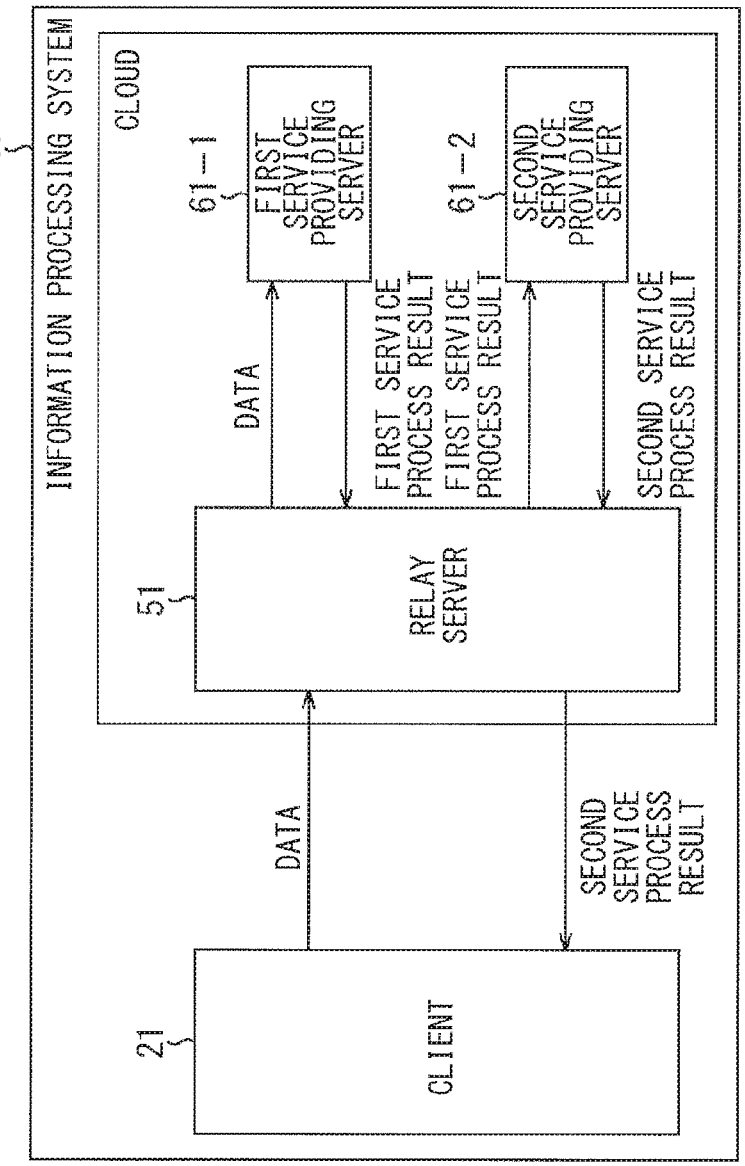
[FIG. 2]

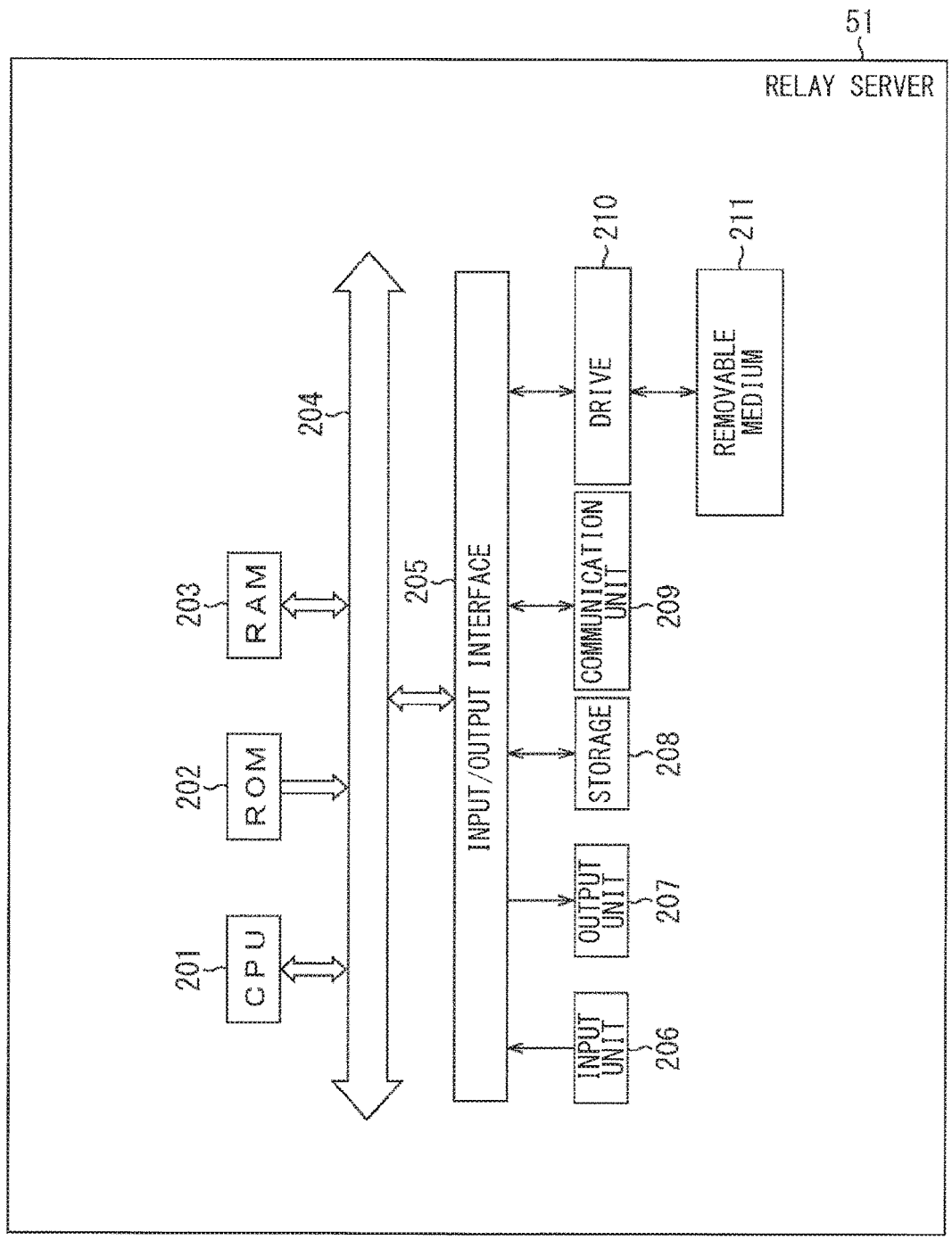
[FIG. 3]

[FIG. 4]
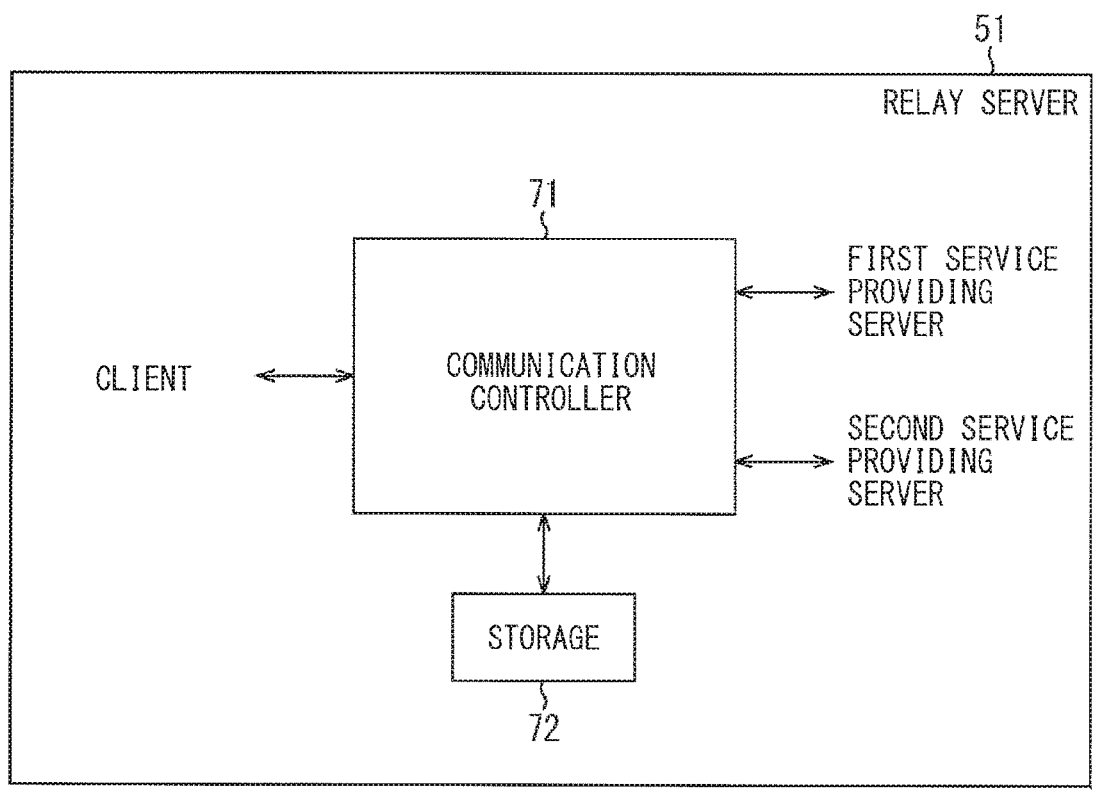

[FIG. 5]
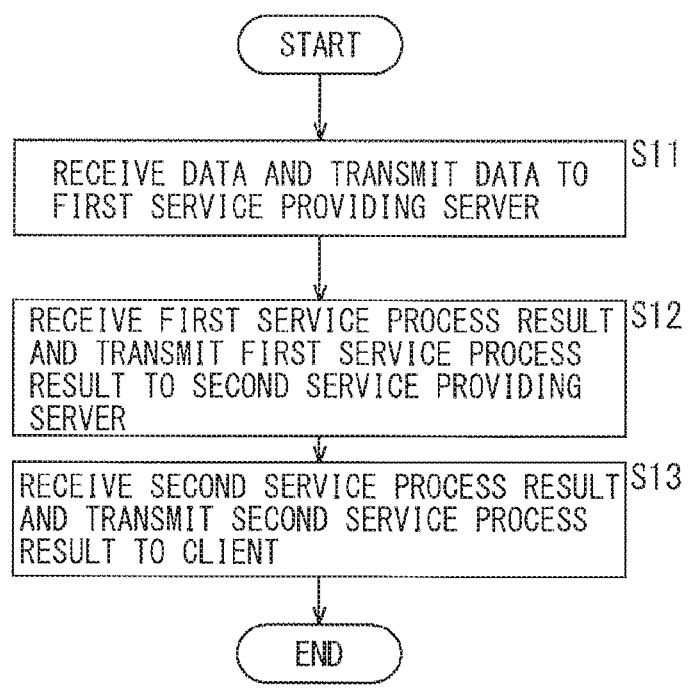

[FIG. 6]
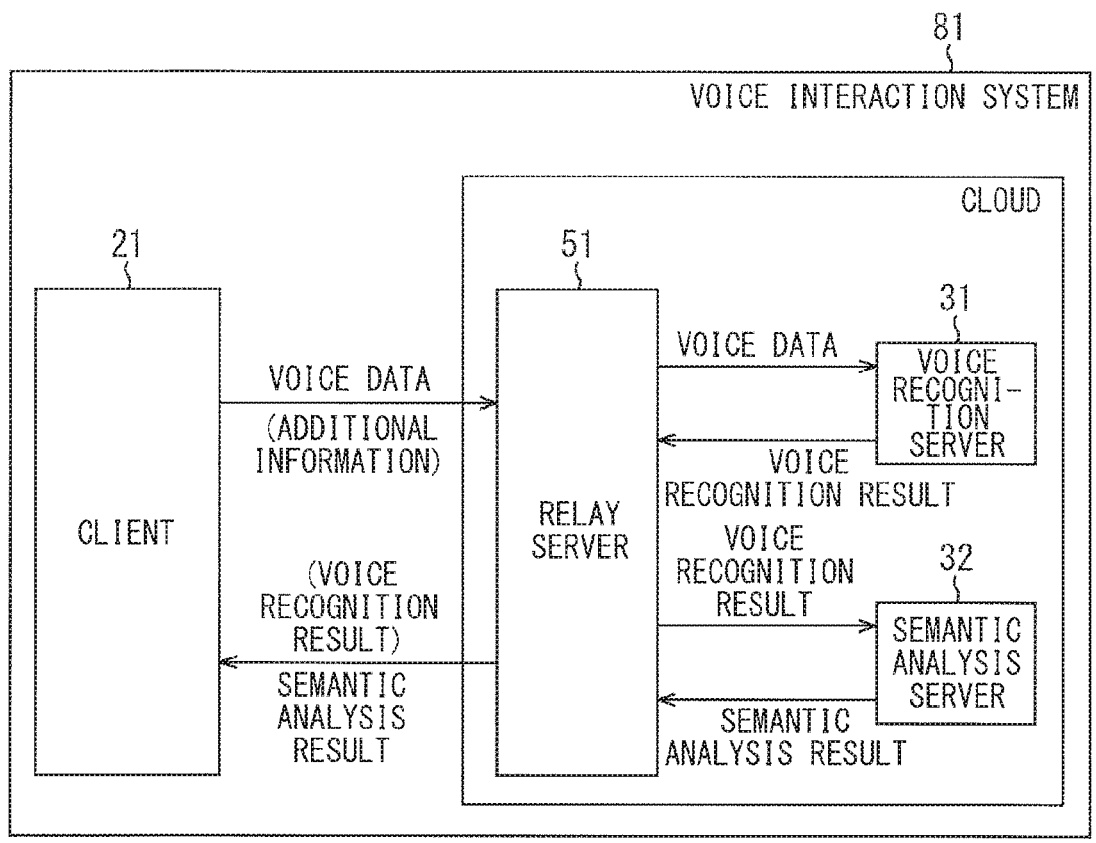

[FIG. 7]
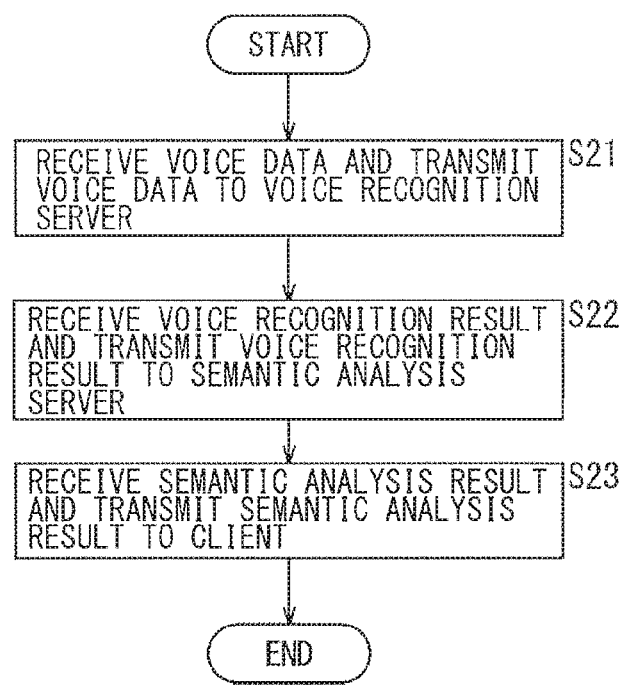

[FIG. 8]
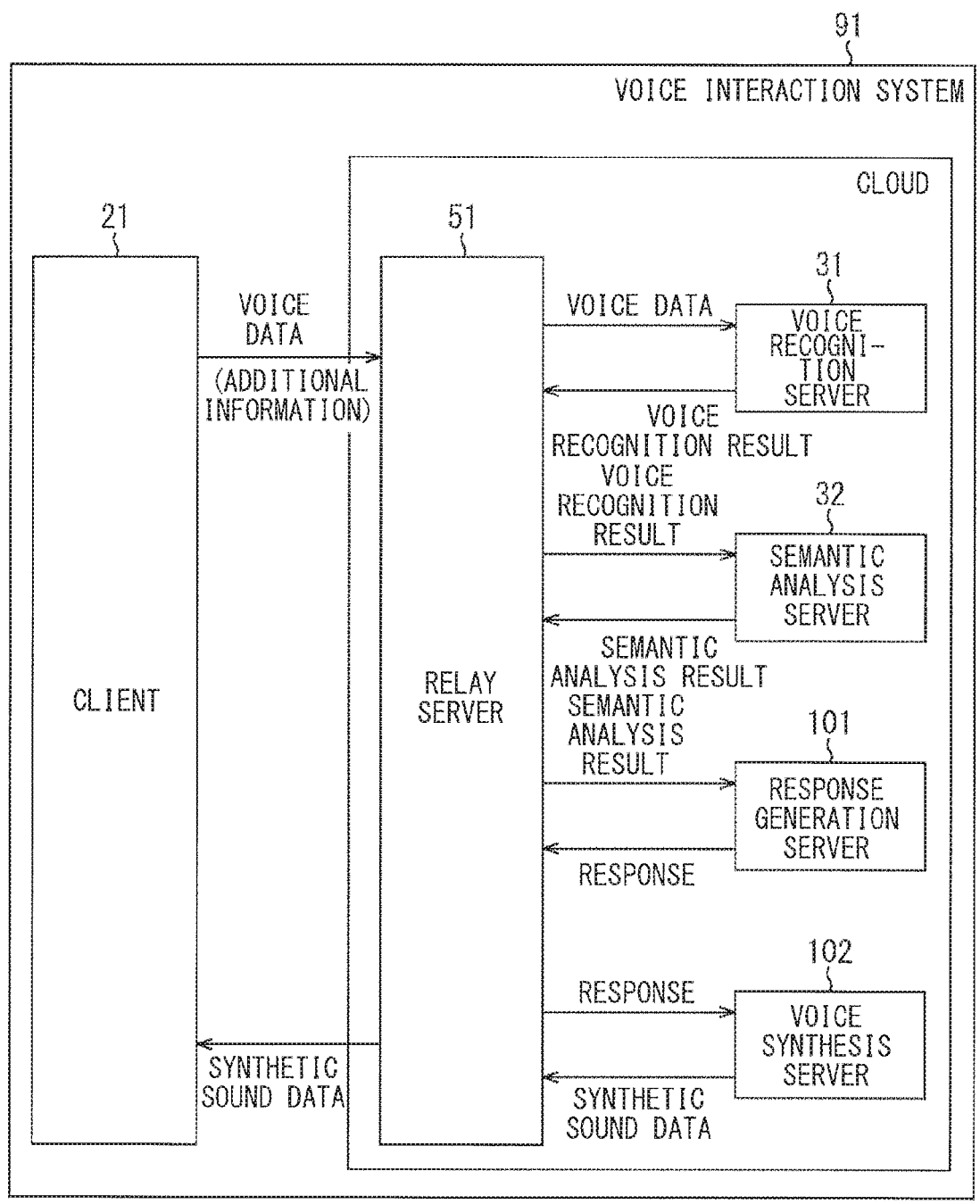

[FIG. 9]
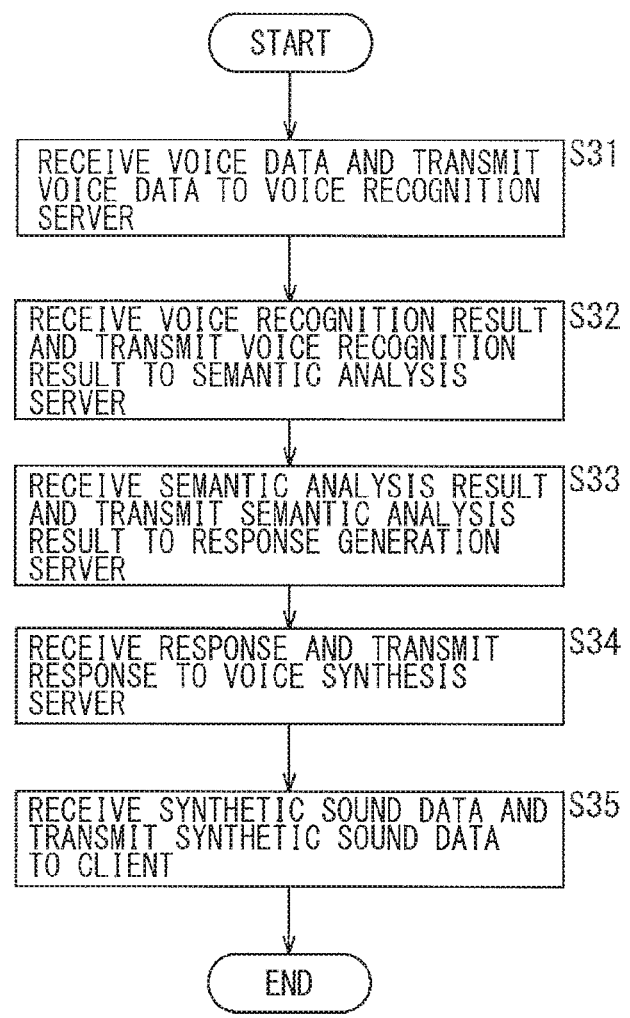

[FIG. 10]
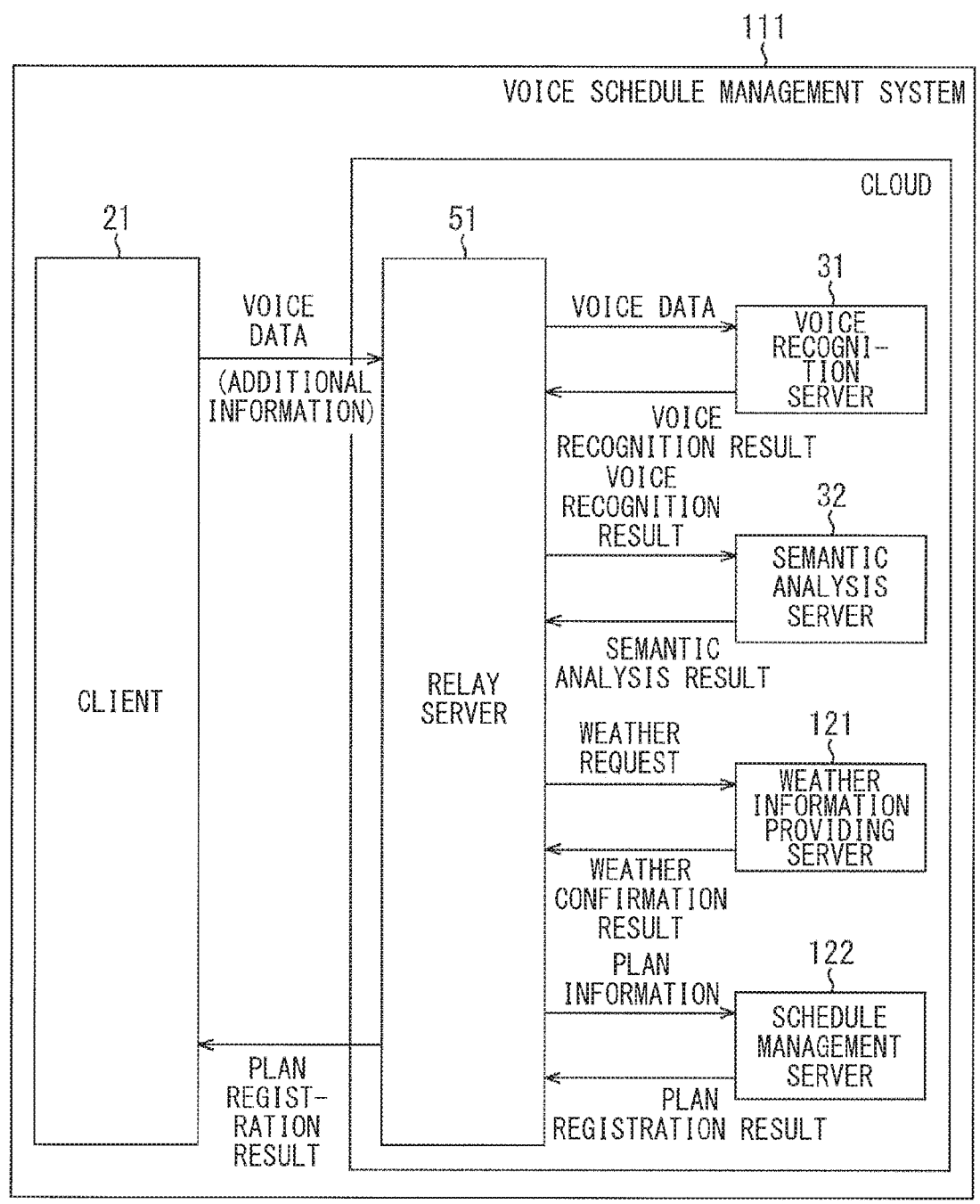

[FIG. 11]
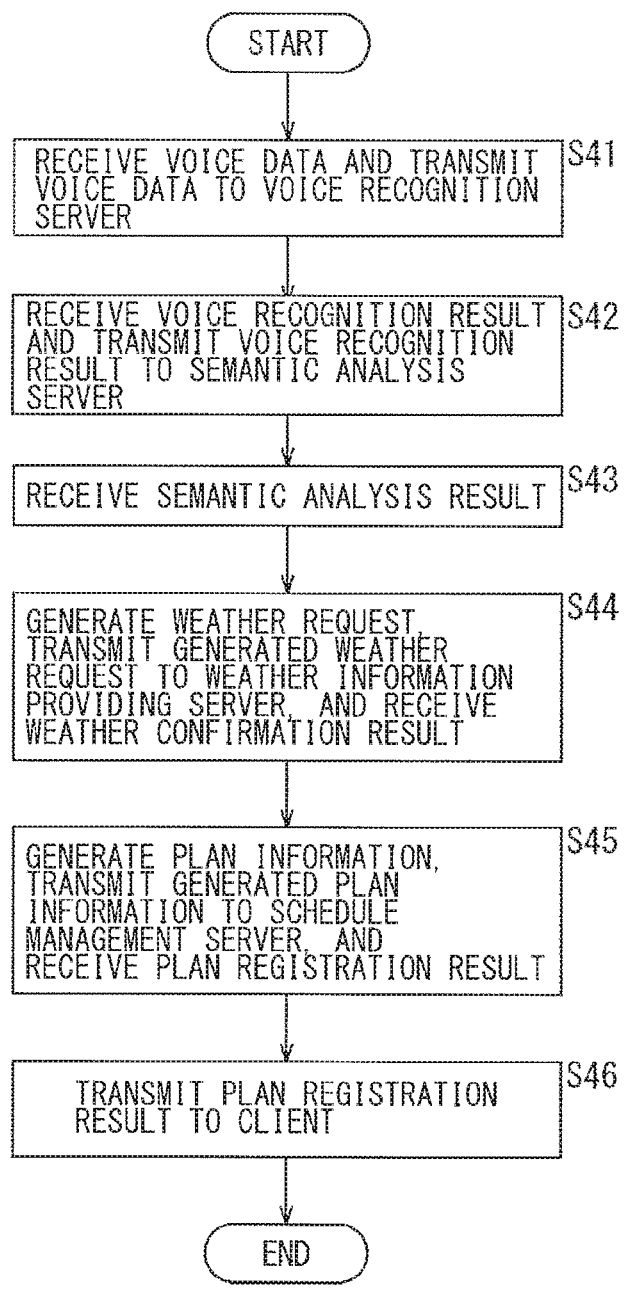

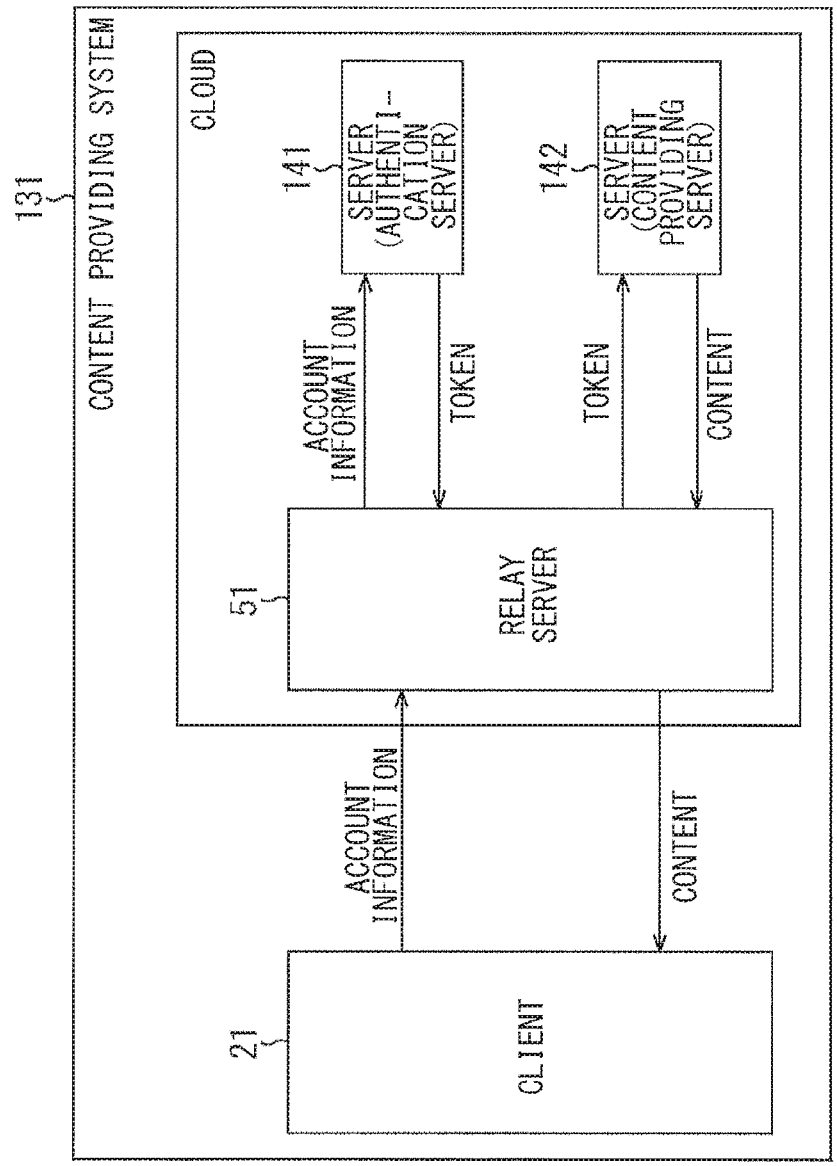
[FIG. 12]

[FIG. 13]
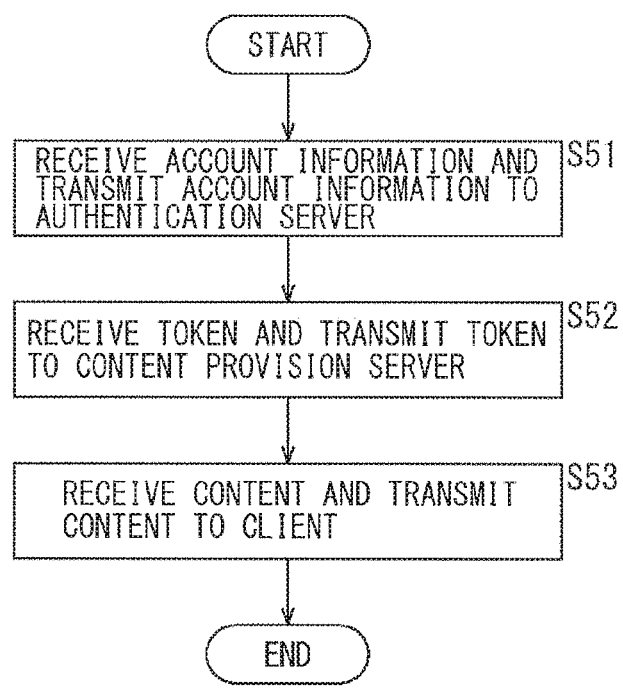

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/029178 filed on Aug. 3, 2018, which claims priority benefit of Japanese Patent Application No. JP 2017-157538 filed in the Japan Patent Office on Aug. 17, 2017. Each of the above-referenced applications is hereby incorporated herein by reference in its entirety.

TECHNICAL FIELD

The present technology relates to an information processing device, an information processing method, and a program, and in particular, to an information processing device, an information processing method, and a program that allow response speed to be improved.

BACKGROUND ART

For example, PTL 1 describes a technique in which an electric apparatus transmits voice data of a user's voice to a central processing means via a network and the central processing means generates an activation output used to activate the electric apparatus from the voice data, transmits the activation output to the electric apparatus, and brings the electric apparatus into operation.

CITATION LIST

Patent Literature

PTL 1: Japanese Unexamined Patent Application Publication No. 2004-12993

SUMMARY OF THE INVENTION

Problems to be Solved by the Invention

As described above, as a form of a service that causes a central processing means to perform a process via a network, there is a so-called cloud service.

In a case where, for example, there are a voice recognition server that performs a voice recognition process and a semantic analysis server that performs a semantic analysis process as servers on a cloud that provide the cloud services, it is possible to build a voice interaction system that outputs a response to voice inputted by a client by using the voice recognition server and the semantic analysis server.

However, the voice recognition server and the semantic analysis server on the cloud each operate independently, but do not work together. Therefore, in the voice interaction system, it is necessary for the client to communicate with the voice recognition server via a network first, and then communicate with the semantic analysis server via the network.

Therefore, there are some cases where response speed from an utterance of a user to the acquisition of a response to the utterance becomes slower.

Similarly, there is a case where the response speed is slow in a system, other than the voice interaction system, using a plurality of servers.

The present technology has been devised in view of such circumstances to allow response speed to be improved.

Means for Solving the Problems

An information processing device or a program according to the present technology is an information processing device including a communication controller or a program for causing a computer to function as such an information processing device. The communication controller performs communication control for receiving transmission data transmitted from a client that transmits the transmission data, transmitting the transmission data to a first service providing server that performs a first service process corresponding to a first service, receiving a first service process result from the first service providing server, transmitting data according to the first service process result to a second service providing server that performs a second service process corresponding to a second service that is different from the first service, receiving a second service process result from the second service providing server, and transmitting the second service process result to the client. The first service process result is obtained by performing the first service process on the transmission data. The second service process result is obtained by performing the second service process on the data according to the first service process result.

An information processing method according to the present technology is an information processing method including a communication control step of performing communication control for receiving transmission data transmitted from a client that transmits the transmission data, transmitting the transmission data to a first service providing server that performs a first service process corresponding to a first service, receiving a first service process result from the first service providing server, transmitting data according to the first service process result to a second service providing server that performs a second service process corresponding to a second service that is different from the first service, receiving a second service process result from the second service providing server, and transmitting the second service process result to the client. The first service process result is obtained by performing the first service process on the transmission data. The second service process result is obtained by performing the second service process on the data according to the first service process result.

In an information processing device, an information processing method, and a program according to the present technology, transmission data transmitted from a client that transmits the transmission data is received, and the transmission data is transmitted to a first service providing server that performs a first service process corresponding to a first service. Moreover, a first service process result obtained by performing the first service process on the transmission data is received from the first service providing server, and data according to the first service process result is transmitted to a second service providing server that performs a second service process corresponding to a second service that is different from the first service. Then, a second service process result obtained by performing the second service process on the data according to the first service process result is received from the second service providing server, and the second service process result is transmitted to the client.

It should be noted that it is possible to provide the program by recording the program in a recording medium or transmitting the program via a transmission medium.

Effects of the Invention

According to the present technology, it is possible to improve response speed.

It should be noted that the effect described here is not necessarily limited, but may be any one of the effects described in the present technology.

BRIEF DESCRIPTION OF DRAWING

FIG. 1 is a diagram illustrating a configuration of an example of a voice interaction system that may use the present technology.

FIG. 2 is a diagram illustrating a configuration example of an embodiment of an information processing system to which the present technology is applied.

FIG. 3 is a block diagram illustrating a configuration example of hardware of a relay server.

FIG. 4 is a diagram illustrating a functional configuration example of the relay server.

FIG. 5 is a flowchart describing a process performed by the relay server in the information processing system.

FIG. 6 is a diagram illustrating a configuration example of a voice interaction system using the information processing system.

FIG. 7 is a flowchart describing a process performed by the relay server in the voice interaction system.

FIG. 8 is a diagram illustrating another configuration example of the voice interaction system using the information processing system.

FIG. 9 is a flowchart describing a process performed by the relay server in the voice interaction system.

FIG. 10 is a diagram illustrating a configuration example of a voice schedule management system using the information processing system.

FIG. 11 is a flowchart describing a process performed by the relay server in the voice schedule management system.

FIG. 12 is a diagram illustrating a configuration example of a content providing system using the information processing system.

FIG. 13 is a flowchart describing a process performed by the relay server in the content providing system.

MODES FOR CARRYING OUT THE INVENTION

The following describes an embodiment for carrying out the present technology. It should be noted that description is given in the following order.
1. Configuration of Voice Interaction System (FIG. 1)
2. Process of Voice Interaction System
3. Configuration of Information Processing System (FIGS. 2 to 4)
4. Process of Information Processing System (FIG. 5)
5. Use Examples of Relay Server (FIGS. 6 to 13)
6. Others
<Configuration Example of Voice Interaction System>

FIG. 1 is a diagram illustrating a configuration of an example of a voice interaction system that may use the present technology.

A voice interaction system 11 illustrated in FIG. 1 includes a client 21, a voice recognition server 31, and a semantic analysis server 32.

In the voice interaction system 11 in FIG. 1, the client 21 communicates with the voice recognition server 31 and the semantic analysis server 32 via a network, for example, the Internet and the like.

The client 21 transmits voice data of voice uttered by a user of the client 21 to the voice recognition server 31 and receives a voice recognition result from the voice recognition server 31.

Furthermore, the client 21 transmits the voice recognition result received from the voice recognition server 31 to the semantic analysis server 32 and receives a semantic analysis result from the semantic analysis server 32.

The client 21 generates a response to the user's utterance by using the semantic analysis result from the semantic analysis server 32, and displays the response or outputs the response by using synthetic sound.

The voice recognition server 31 and the semantic analysis server 32 are servers that provide services by a cloud (cloud computing).

That is, the voice recognition server 31 provides a voice recognition service that recognizes voice. Specifically, the voice recognition server 31 receives the voice data from the client 21 and performs a voice recognition process on the voice data. Then, the voice recognition server 31 transmits a voice recognition result obtained by performing the voice recognition process to the client 21.

The semantic analysis server 32 provides a semantic analysis service that analyzes meanings and content of a character string, for example, the voice recognition result or the like. Specifically, the semantic analysis server 32 receives the voice recognition result from the client 21 and performs a semantic analysis process on the voice recognition result. Then, the semantic analysis server 32 transmits the semantic analysis result obtained by performing the semantic analysis process to the client 21.

Here, the "semantic analysis" in the semantic analysis process performed by the semantic analysis server 32 means general analysis on meanings and content of character strings and is a wide concept including SLU (Spoken Language Understanding), NLU (Natural Language Understanding), and SA (Semantic Analysis).
<Process of Voice Interaction System>

A process of the voice interaction system 11 in FIG. 1 is described.

In the voice interaction system 11, when the user of the client 21 utters, the client 21 transmits voice data of the utterance to the voice recognition server 31.

The voice recognition server 31 receives the voice data from the client 21. Moreover, the voice recognition server 31 performs the voice recognition process on the voice data from the client 21 and transmits a voice recognition result obtained from the voice recognition process to the client 21.

Here, the voice recognition server 31 outputs a character string, for example, in a JSON (Java Script Object Notation) format as the voice recognition result.

For example, in response to voice data of an utterance "Tell me tomorrow's weather in Tokyo", the voice recognition server 31 outputs a voice recognition result (1) including a character string in the JSON format as follows.

{
"id": "2017-03-20/00-14-10",
"locale": "ja_JP",
"hypotheses" :[{"utterance": "Tell me tomorrow's weather in Tokyo",
"confidence": 1}],
"Status": 0
}  ...(1)

id in the second line in the voice recognition result (1) represents a date and time when the voice is recognized.

locale in the third line in the voice recognition result (1) represents a language of the voice data and a region where the language of the voice data is used.

ja at the head of ja_JP described in the line of locale represent that the language of the voice data is Japanese, and JP at the end represents that the region where Japanese is used is Japan. In the line of locale, for example, EN_UK, EN_US, and the like are additionally described in some cases. EN at the head of EN_UK represents that a language of voice data is English, and UK at the end represents that a region where English is used is the United Kingdom. As described above, EN at the head of EN_US represents that a language of voice data is English, and US at the end represents that a region where English is used is the United States of America.

hypotheses in the fourth line in the voice recognition result (1) indicates information regarding a hypothesis as the recognition result. hypotheses includes utterance and confidence.

utterance is text representing the hypothesis. confidence represents a level of reliability of the hypothesis as a numerical value. confidence takes a real number in a range of zero to one, and as the value increase, the reliability is higher.

Status in the sixth line in the voice recognition result (1) represents a status of the voice recognition process as a numerical value. Status takes zero or a minus value. Status taking zero represents a normal completion of the voice recognition process, and Status taking a minus value indicates an error in the voice recognition process.

The client 21 receives the voice recognition result sent from the voice recognition server 31 and transmits the received voice recognition result to the semantic analysis server 32.

The semantic analysis server 32 receives the voice recognition result sent from the client 21. Moreover, the semantic analysis server 32 performs the semantic analysis process on the voice recognition result from the client 21 and transmits a semantic analysis result obtained from the semantic analysis process to the client 21.

For example, it is possible for the semantic analysis server 32 to output a semantic analysis result (2) as follows with respect to the voice recognition result (1) obtained by performing the voice recognition process on the voice data of the utterance "Tell me tomorrow's weather in Tokyo".

DOMAIN-GOAL: weather confirmation
DateTime: tomorrow
Location: Tokyo . . . (2)

DOMAIN-GOAL in the first line in the semantic analysis result (2) represents an outline and the like of meanings and content of a character string on which semantic analysis is performed, and there is a case where DOMAIN-GOAL is referred to as operation command or intent.

As DOMAIN-GOAL, in addition to "weather confirmation", for example, it is possible to employ character strings and the like representing various meanings such as "alarm set", "schedule check", or the like.

It is possible to appropriately determine a character string to be employed as DOMAIN-GOAL, for example, by a developer of the semantic analysis server 32. An application and a system using (semantic analysis result of) the semantic analysis server 32 are activated in accordance with DOMAIN-GOAL, and it is possible for the application and the system to, for example, generate a response to meanings and content represented by the character string serving as DOMAIN-GOAL and perform a process according to the character string serving as DOMAIN-GOAL.

Each of DateTime in the second line and Location in the third line in the semantic analysis result (2) is complementary information that complements DOMAIN-GOAL. This complementary information is also referred to as slot, and it is possible to define various items for each DOMAIN-GOAL.

DateTime in the second line in the semantic analysis result (2) is "weather confirmation" that is the complementary information of DOMAIN-GOAL and represents a date and time when the weather is confirmed. It is also possible to express DateTime by, for example, a specific data and time, in addition to "tomorrow", "the day after tomorrow", and the like.

Location in the third line in the semantic analysis result (2) is "weather confirmation" that is the complementary information of DOMAIN-GOAL and represents a place where the weather is confirmed.

Furthermore, it is possible for the semantic analysis server 32 to perform the semantic analysis process even on (voice recognition result of) an utterance such as a chat or a monologue of a user in which DOMAIN-GOAL is not fixed.

For example, it is possible for the semantic analysis server 32 to output a semantic analysis result (3) as follows with respect to a voice recognition result obtained by performing the voice recognition process on the voice data of the utterance "I am thinking of going to the amusement park because the weather will be fine tomorrow".

Category: INTERESTING
Topic: amusement park
DateTime: tomorrow
Condition: FINE_WEATHER . . . (3)

Category in the first line in the semantic analysis result (3) indicates a genre of uttered content.

Topic in the second line in the semantic analysis result (3) indicates a topic of the uttered content.

DateTime in the third line in the semantic analysis result (3) indicates a date and time of appearance in the uttered content.

Condition in the third line in the semantic analysis result (3) indicates some kind of condition in the uttered content.

In addition, for example, it is possible for the semantic analysis server 32 to output a semantic analysis result (4) as follows with respect to a voice recognition result obtained by performing the voice recognition process on the voice data of the utterance "Something good happened today. Will you hear my story?".

Category: HEAR MY STORY
Topic: amusement park
DateTime: today
Condition: GOOD EVENT . . . (4)

The client 21 receives the semantic analysis result from the semantic analysis server 32 as described above. Moreover, the client 21 generates a response to the user's utterance by using the semantic analysis result from the semantic analysis server 32, and outputs the response (displays the response or outputs the response by using synthetic sound).

In a case where the voice recognition process and the semantic analysis process are performed on a general utterance, a memory having several gigabytes or more is necessary, and a process load is heavy. Therefore, in the voice interaction system 11 in FIG. 1, the voice recognition process and the semantic analysis process are performed by not the client 21, but the voice recognition server 31 and the semantic analysis server 32 that are the servers on the cloud.

The voice recognition server 31 and the semantic analysis server 32 that are the servers on the cloud do not particularly work together. Therefore, in a case where voice interaction is performed, it is necessary for the client 21 to transmit the voice data to the voice recognition server 31 and receive the voice recognition result with respect to the voice data from the voice recognition server 31, and to transmit the voice recognition result to the semantic analysis server 32 and receive the semantic analysis result with respect to the voice recognition result from the semantic analysis server 32.

Therefore, before obtaining a response to the utterance, it is necessary for the client 21 to perform communication twice, including communication with the voice recognition server 31 on the cloud and communication with the semantic analysis server 32 on the cloud. This slows response speed from the utterance to the acquisition of the response.

<Configuration Example of Information Processing System>

FIG. 2 is a diagram illustrating a configuration example of an embodiment of an information processing system to which the present technology is applied.

An information processing system 41 includes the client 21, a relay server 51, a first service providing server 61-1, and a second service providing server 61-2.

In the information processing system 41 in FIG. 2, the client 21 and the relay server 51 communicate with each other via a network, for example, the Internet and the like. Meanwhile, the relay server 51, the first service providing server 61-1, and the second service providing server 61-2 are servers on the cloud. It is possible to perform communication at high speed between the relay server 51 and the first service providing server 61-1 and between the relay server 51 and the second service providing server 61-2.

The client 21 transmits data inputted by the user of the client 21, data instructed from the user, and data given from an application program and the like of the client 21 to the relay server 51 as transmission data. Furthermore, the client 21 receives a second service process result transmitted from the relay server 51.

The relay server 51 receives the transmission data transmitted from the client 21 and transmits the received transmission data to the first service providing server 61-1.

Moreover, the relay server 51 receives a first service process result transmitted from the first service providing server 61-1 and transmits (data according to) the first service process result to the second service providing server 61-2. Furthermore, the relay server 51 receives the second service process result transmitted from the second service providing server 61-2 and transmits the received service process result to the client 21.

The first service providing server 61-1 provides a first service. That is, the first service providing server 61-1 receives the transmission data transmitted from the relay server 51 and performs a first service process corresponding to the first service on the transmission data. Moreover, the first service providing server 61-1 transmits a first service process result obtained by performing the first service process to the relay server 51.

The second service providing server 61-2 provides a second service different from the first service. That is, the second service providing server 61-2 receives (data according) the first service process result transmitted from the relay server 51 and performs a second service process corresponding to the second service on the first service process result. Moreover, the second service providing server 61-2 transmits a second service process result obtained by performing the second service process to the relay server 51.

A process of the information processing system 41 in FIG. 2 is described.

In the voice interaction system 11, the client 21 transmits predetermined data to the relay server 51 as transmission data. The relay server 51 receives the transmission data from the client 21 and transmits the received transmission data to the first service providing server 61-1.

The first service providing server 61-1 receives the transmission data from the relay server 51 and performs the first service process on the transmission data. Moreover, the first service providing server 61-1 transmits a first service process result obtained from the first service process to the relay server 51.

Moreover, the relay server 51 receives a first service process result from the first service providing server 61-1 and transmits data according to the first service process result to the second service providing server 61-2.

The second service providing server 61-2 receives the data according to the first service process result from the relay server 51 and performs the second service process on the data. Moreover, the second service providing server 61-2 transmits a second service process result obtained from the second service process to the relay server 51.

The relay server 51 receives the second service process result from the second service providing server 61-2 and transmits the received service process result to the client 21.

The client 21 receives a second service process result from the relay server 51.

In the information processing system 41, it is possible for the client 21 to obtain the second service process result by communicating with the relay server 51, that is, transmitting the transmission data and receiving the second service process result, from the relay server 51, obtained by performing the first service process and the second service process on the transmission data.

For example, the relay server 51, the first service providing server 61-1, and the second service providing server 61-2 are configured on the cloud, and it is possible to perform communication at high speed between the relay server 51 and the first service providing server 61-1 and between the relay server 51 and the second service providing server 61-2. Therefore, it is possible to improve response speed from the transmission of the transmission data to the acquisition of the second service process result in comparison with a case where the client 21 individually communicates with the first service providing server 61-1 and the second service providing server 61-2.

That is, in a case where the client 21 individually communicates with the first service providing server 61-1 and the second service providing server 61-2 and obtains the second service process result with respect to the transmission data, it is necessary for the client 21 to transmit the transmission data to the first service providing server 61-1 and receive the first service process result with respect to the transmission data from the first service providing server 61-1, and to transmit (data according to) the first service process result to the second service providing server 61-2 and receive the second service process result with respect to the first service process result from the second service providing server 61-2 via the network such as the Internet. It is necessary for the client 21 to perform communication twice including the communication with the first service providing server 61-1 and the communication with the second service providing server 61-2.

In contrast, in the information processing system 41, it is possible for the client 21 to obtain the second service process result with respect to the transmission data by single communication with the relay server 51, that is, by transmitting the transmission data to the relay server 51 and receiving the second service process result, from the relay server 51, obtained by performing the first service process and the second service process on the transmission data.

Furthermore, in a case where the client 21 individually communicates with the first service providing server 61-1 and the second service providing server 61-2 and obtains the second service process result with respect to the transmission data, it is necessary for the client 21 to implement a function for communicating with the first service providing server 61-1 and a function for communicating with the second service providing server 61-2.

In contrast, in the information processing system 41, it is not necessary for the client 21 to implement the function for communicating with the first service providing server 61-1 and the function for communicating with the second service providing server 61-2, and it is sufficient if the client 21 implements a function for communicating with the relay server 51. This simplifies implementation.

Here, it can be understood that the relay server 51 functionally performs a relay between the client 21 and the first service providing server 61-1 and a relay between the client 21 and the second service providing server 61-2.

Furthermore, the relay server 51 performs the first service process on the transmission data from the client 21, and further returns the second service process result obtained by performing the second service process to the client 21. Therefore, it can also be understood that the relay server 51 is a server that provides a so-called integrated service in which the first service and the second service are integrated. The following makes description as assuming that the relay server 51 is a server that provides the integrated service.

It should be noted that, in FIG. 2, the information processing system 41 is provided with two service providing servers including the first service providing server 61-1 and the second service providing server 61-2. However, it is possible to provide three or more service providing servers in the information processing system 41. In a case where three or more service providing servers are provided in the information processing system 41, selecting two or more service providing servers from among the three or more service providing servers and performing communication allow the relay server 51 to provide an integrated service in which respective services provided by the two or more service providing servers are integrated.

FIG. 3 is a block diagram illustrating a configuration example of hardware of the relay server 51 in FIG. 2.

It is possible for the relay server 51 to include a computer as illustrated in FIG. 3.

In FIG. 3, CPU (Central Processing Unit) 201 executes various processes in accordance with a program stored in ROM (Read Only Memory) 202 or a program loaded from a storage 208 to RAM (Random Access Memory) 203. The RAM 203 stores, as appropriate, data or the like necessary for the CPU 201 to execute various processes.

The CPU 201, the ROM 202, and the RAM 203 are coupled to each other via a bus 204. This bus 204 is also coupled to an input/output interface 205.

The input/output interface 205 is coupled to an input unit 206 including a keyboard, a mouse, and the like, an output unit 207 including a display including LCD (liquid crystal display), a speaker, and the like, the storage 208 including a hard disk and the like, and a communication unit 209 including a modem, a terminal adapter, and the like. The communication unit 209 performs a communication proces via a network, for example, the Internet and the like.

The input/output interface 205 is also coupled, as necessary, to a drive 210 and has a removable medium 211 such as a magnetic disk, an optical disc, or a semiconductor memory mounted thereon as appropriate. A computer program read out therefrom is installed, as needed, on the storage 208.

FIG. 4 is a diagram illustrating a functional configuration example of the relay server 51 in FIG. 2.

The functional configuration in FIG. 4 is (virtually) achieved by executing the program loaded to the RAM 203 by the CPU 201 (FIG. 3).

The relay server 51 includes a communication controller 71 and a storage 72.

The communication controller 71 performs communication control between the client 21, the first service providing server 61-1, and the second service providing server 61-2 in accordance with server information stored in the storage 72.

That is, the communication controller 71 receives the transmission data transmitted from the client 21. Moreover, the communication controller 71 transmits the transmission data from the client 21 to the first service providing server 61-1.

Furthermore, the communication controller 71 receives the first service process result with respect to the transmission data transmitted by the first service providing server 61-1 with respect to the transmission data from the client 21.

Moreover, the communication controller 71 transmits (data according to) the first service process result from the first service providing server 61-1 to the second service providing server 61-2. Furthermore, the communication controller 71 receives the second service process result with respect to the first service process result transmitted by the second service providing server 61-2 with respect to the first service process result.

Then, the communication controller 71 transmits the second service process result from the second service providing server 61-2 to the client 21.

The storage 72 stores the server information used to access service providing servers that provide the respective services included in the integrated service provided by the relay server 51, that is, here, the first service providing server 61-1 and the second service providing server 61-2.

The communication controller 71 refers to the server information stored in the storage 72 and accesses (communicates with) the first service providing server 61-1 and the second service providing server 61-2.

<Process of Information Processing System>

FIG. 5 is a flowchart describing a process performed by the relay server 51 in the information processing system 41.

The relay server 51 waits for transmission of the transmission data from the client 21, then, receives the transmission data and transmits the transmission data to the first service providing server 61-1 in step S11.

The first service providing server 61-1 transmits the first service process result obtained by performing the first service process on the transmission data transmitted from the relay server 51 to the relay server 51. Therefore, the relay server 51, in step S12, receives the first service process result transmitted from the first service providing server 61-1 and transmits (data according to) the first service process result to the second service providing server 61-2.

The second service providing server 61-2 transmits the second service process result obtained by performing the second service process on the first service process result transmitted from the relay server 51 to the relay server 51. Therefore, the relay server 51, in step S13, receives the second service process result transmitted from the second service providing server 61-2 and transmits the received second service process result to the client 21.

<Use Example 1 of Relay Server>

FIG. 6 is a diagram illustrating a configuration example of a voice interaction system using the information processing system 41 in FIG. 2.

It should be noted, throughout the drawings, the same reference numerals are given to portions corresponding to FIG. 1 or 2 and the description thereof is omitted as appropriate below.

A voice interaction system 81 includes the client 21, the voice recognition server 31, the semantic analysis server 32, and the relay server 51.

That is, the voice interaction system 81 in FIG. 6 is common to the voice interaction system 11 in FIG. 1 in that the client 21, the voice recognition server 31, and the semantic analysis server 32 are included. However, the voice interaction system 81 is different from the voice interaction system 11 in that the relay server 51 in FIG. 5 is newly provided.

In the voice interaction system 81, the voice recognition server 31, the semantic analysis server 32, and the relay server 51 are configured on the cloud. In the voice interaction system 81, it is possible for the client 21 to receive a voice interaction service serving as the integrated service by accessing the relay server 51 among the voice recognition server 31, the semantic analysis server 32, and the relay server 51 on the cloud. Therefore, it is possible to refer to the relay server 51 on the cloud accessed by the client 21, for example, as CSG (Cloud Speech Gate).

In the voice interaction system 81 in FIG. 6, the client 21 transmits voice data of an utterance of the user of the client 21 to the relay server 51 as transmission data in accordance with the utterance.

Furthermore, the client 21 receives a semantic analysis result from the relay server 51, generates a response to the utterance of the user of the client 21 by using the semantic analysis result, and outputs the response.

The voice recognition server 31 corresponds to the first service providing server 61-1 in FIG. 2. The voice recognition server 31 receives the voice data transmitted from the relay server 51 and performs the voice recognition process serving as the first service process on the voice data. The voice recognition server 31 transmits a voice recognition result obtained by performing the voice recognition process to the relay server 51.

The semantic analysis server 32 corresponds to the second service providing server 61-2 in FIG. 2. The semantic analysis server 32 receives the voice recognition result transmitted from the relay server 51 and performs the semantic analysis process serving as the second service process on the voice recognition result. The semantic analysis server 32 transmits the semantic analysis result obtained by performing the semantic analysis process to the relay server 51.

The relay server 51 receives the voice data transmitted from the client 21 and transmits the received voice data to the voice recognition server 31. Furthermore, the relay server 51 receives the voice recognition result transmitted from the voice recognition server 31 and transmits the voice recognition result to the semantic analysis server 32 as data according to the voice recognition result. Moreover, the relay server 51 receives the semantic analysis result transmitted from the semantic analysis server 32 and transmits the received semantic analysis result to the client 21.

<Process in Voice Interaction System>

Next, a process executed in the voice interaction system 81 is described with reference to FIG. 7.

FIG. 7 is a flowchart describing a process performed by the relay server 51 in the voice interaction system 81.

For example, in the voice interaction system 81, when the user of the client 21 utters, the client 21 transmits voice data of the utterance to the relay server 51 via a network, for example, the Internet and the like.

In step S21, the relay server 51 receives the voice data transmitted from the client 21 and transmits the received voice data to the voice recognition server 31.

The voice recognition server 31 receives the voice data transmitted from the relay server 51 and performs the voice recognition process on the voice data. Moreover, the voice recognition server 31 transmits a voice recognition result obtained from the voice recognition process to the relay server 51.

In step S22, the relay server 51 receives the voice recognition result transmitted from the voice recognition server 31 as described above and transmits the voice recognition result to the semantic analysis server 32.

The semantic analysis server 32 receives the voice recognition result transmitted from the relay server 51 and performs the semantic analysis process on the voice recognition result. Then, the semantic analysis server 32 transmits the semantic analysis result obtained from the semantic analysis process to the relay server 51.

In step S23, the relay server 51 receives the semantic analysis result transmitted from the semantic analysis server 32 as described above and transmits the semantic analysis result to the client 21.

As described above, in the voice interaction system 81, the relay server 51 relays the communication with the voice recognition server 31 and the semantic analysis server 32 that are servers that provide two individual services. Therefore, transmitting voice data of an utterance to the relay server 51 allows the client 21 to acquire the semantic analysis result regarding the utterance.

As a result, it is possible to improve response speed of the voice interaction system 81, and implementation of the client 21 is simplified.

It should be noted that, as indicated in parentheses in FIG. 6, it is possible for the client 21 to transmit auxiliary information, other than the voice data, that assists the voice recognition process or the semantic analysis process to the relay server 51 as additional information that is added to the voice data. As the additional information, for example, it is possible to employ names of a user's family members including the user, an utterance history, application information regarding an application that generates a response by using the semantic analysis result, an image obtained by photographing the user and a direction pointed by a finger of the user, an image obtained by photographing a direction of the user's view, sensing information obtained by sensing a line of sight or a gesture of the user, and the like.

For example, it is assumed that, in a case where a list of restaurant searching results is displayed on a screen of the client 21, the user of the client 21 utters "Please reserve this restaurant" regarding one restaurant in the list. In this case, the semantic analysis server 32 outputs a semantic analysis result (5) as follows.

DOMAIN-GOAL: RESTRANT-RESERVE
Target: this restaurant . . . (5)

Although the semantic analysis result (5) represents that a reservation is made for "this restaurant", it is not possible to recognize a specific restaurant to be reserved according to the semantic analysis result (5).

Therefore, it is possible for the client 21 to transmit, for example, the image of the list of the restaurant searching results displayed on the screen and the line of sight of the user (sensing information) to the relay server 51 as the additional information.

For example, it is assumed that the user of the client 21 casts a line of sight to "AAA restaurant" in the list of the restaurant searching results displayed on the screen of the client 21 and the client 21 transmit the image of the list of the restaurant searching results and the line of sight of the user to the relay server 51 as the additional information.

The relay server 51 receives the image and the line of sight of the user that are transmitted from the client 21 and serve as the additional information, and transmits the image and the line of sight of the user to the semantic analysis server 32 together with the voice recognition result from the voice recognition server 31.

The semantic analysis server 32 performs the semantic analysis process on the two pieces of data including the voice recognition result and the additional information transmitted from the relay server 51.

That is, the semantic analysis server 32 performs the semantic analysis process on the voice recognition result and obtains, for example, the semantic analysis result (5). Moreover, the semantic analysis server 32 corrects the semantic analysis result (5) in accordance with the additional information and obtains a semantic analysis result (6) in which "this restaurant" in the semantic analysis result (5) is changed to "AAA restaurant".

DOMAIN-GOAL: RESTRANT-RESERVE
Target: "AAA restaurant" . . . (6)

The semantic analysis result (6) corrected in accordance with the additional information allows, for example, a server that provides a service for reserving a restaurant to normally perform a process for reserving the specific restaurant "AAA restaurant".

Furthermore, transmitting an image (face image) of a face of the uttering user from the client 21 to the relay server 51 as the additional information and transmitting the face image serving as the additional information from the relay server 51 to the semantic analysis server 32 make it possible for the semantic analysis server 32 to, for example, in a case where "fine" is uttered, accurately determine a meaning of "fine" by determining whether "fine" means unnecessity or allowance in consideration of the user's expression in the face image.

Moreover, transmitting a utterance history of the user from the client 21 to the relay server 51 as the additional information and transmitting the utterance history serving as the additional information from the relay server 51 to the semantic analysis server 32 make it possible for the semantic analysis server 32 to determine meanings and content of the utterance in consideration of the utterance history. For example, in a case where it is possible to recognize in response to the questioning utterance "How is the weather today?" that the user stays in Osaka by referring to the utterance history, it is possible for the semantic analysis server 32 to obtain a semantic analysis result that the user wishes to ask the weather in Osaka in response to the questioning utterance "How is the weather today?".

Furthermore, transmitting the name of the user's family member from the client 21 to the relay server 51 as the additional information and transmitting the name of the user's family member that serves as the additional information from the relay server 51 to the voice recognition server 31 makes it possible for the voice recognition server 31 to, when the name of the user's family member appears in an utterance, accurately perform voice recognition on the name of the user's family member appearing in the utterance.

In this way, the relay server 51 receives the additional information other than the voice data from the client 21 and transmits the received additional information to the voice recognition server 31 and the semantic analysis server 32, thereby making it possible to improve accuracy in the voice recognition process and the semantic analysis process.

Furthermore, as indicated in parentheses in FIG. 6, the client 21 may receive an interim result of the voice recognition and the semantic analysis from the relay server 51 as needed, for example, by performing bidirectional communication with the relay server 51 by using a bidirectional communication protocol between a Web server such as WebSocket and a browser. Receiving the interim result from the relay server 51 as needed makes it possible for the user of the client 21 to, in a case where the voice recognition server 31 and the semantic analysis server 32 obtain a wrong interim result, transmit an instruction to correct the result. Accordingly, it is possible to improve the accuracy in the voice recognition process and the semantic analysis process.

It should be noted that, as a format of the transmission data to be transmitted from the client 21 to the relay server 51, it is possible to employ a format in which "type", "size", and "data" are arranged in this order. For example, "type" represents a data type of "data" with one-byte data. The data type includes, for example, "voice data", "utterance history" serving as the additional information, and the like. It is possible to include a user name of the user of the client 21 in the data type. For example, "size" represents a size of "data" with four-byte data. In "data", the data of the data type represented by "type" that has the size (the number of bytes) representing "size is disposed.

<Use Example 2 of Relay Server>

FIG. 8 is a diagram illustrating another configuration example of the voice interaction system using the information processing system 41 in FIG. 2.

It should be noted that, throughout the drawings, the same reference numerals are given to portions corresponding to FIG. 6 and the description thereof is omitted as appropriate below.

A voice interaction system 91 includes the client 21, the voice recognition server 31, the semantic analysis server 32, the relay server 51, a response generation server 101, and a voice synthesis server 102.

That is, the voice interaction system 91 in FIG. 8 is common to the voice interaction system 81 in FIG. 6 in that the client 21, the relay server 51, the voice recognition server 31, and the semantic analysis server 32 are included. However, the voice interaction system 91 is different from the voice interaction system 81 in that the response generation server 101 and the voice synthesis server 102 are newly provided.

In the voice interaction system 91, four service providing servers that mean three or more service providing servers, that is, the voice recognition server 31, the semantic analysis server 32, the response generation server 101, and the voice synthesis server 102 are provided as service providing servers that provide services.

In the voice interaction system 91, the voice recognition server 31, the semantic analysis server 32, the relay server 51, the response generation server 101, and the voice synthesis server 102 are configured on the cloud.

In the voice interaction system 91 in FIG. 8, similarly to a case of FIG. 6, the client 21 transmits voice data of a conversation in accordance with an utterance of the user of the client 21 to the relay server 51, and additionally receives synthetic sound data transmitted from the relay server 51.

In FIG. 8, similarly to a case of FIG. 6, the relay server 51 communicates with each of the client 21, the voice recognition server 31, and the semantic analysis server 32, and additionally communicates with each of the response generation server 101 and the voice synthesis server 102.

That is, the relay server 51 transmits a semantic analysis result received from the semantic analysis server 32 to the response generation server 101. Furthermore, the relay server 51 receives a response transmitted from the response generation server 101 and transmits the response to the voice synthesis server 102. Moreover, the relay server 51 receives the synthetic sound data transmitted from the voice synthesis server 102 and transmits the received synthetic sound data to the client 21.

The response generation server 101 corresponds to a service providing server that provides a service similarly to the voice recognition server 31 or the semantic analysis server 32. The response generation server 101 receives the semantic analysis result transmitted from the relay server 51 and performs a response generation process that generates a response to an utterance (content) represented by the semantic analysis result on the semantic analysis result as a service process corresponding to a service provided by the response generation server 101. The response generation server 101 transmits the response obtained by performing the response generation process to the relay server 51.

The voice synthesis server 102 corresponds to a service providing server that provides a service similarly to the voice recognition server 31 or the semantic analysis server 32. The voice synthesis server 102 receives the response transmitted from the relay server 51 and performs a voice synthesis process that generates synthetic sound (data) on the response as a service process corresponding to the service provided by the voice synthesis server 102. The voice synthesis server 102 transmits the synthetic sound data obtained by performing the voice synthesis process to the relay server 51.

It should be noted that, in the voice interaction system 91, similarly the voice interaction system 81 in FIG. 6, it is also possible to transmit and receive the additional information and the interim result. The same applies to an embodiment described later.

<Process in Voice Interaction System>

Next, a process executed in the voice interaction system 91 is described with reference to FIG. 9.

FIG. 9 is a flowchart describing a process performed by the relay server 51 in the voice interaction system 91.

In steps S31 and S32, the voice interaction system 91 performs processes similar to the respective processes in steps S21 and S22 in FIG. 7.

Then, in step S33, the relay server 51 receives the semantic analysis result transmitted from the semantic analysis server 32 and transmits the semantic analysis result to the response generation server 101.

The response generation server 101 receives the semantic analysis result transmitted from the relay server 51 and performs the response generation process that generates (text serving as) a response to an utterance having meanings and content represented by the semantic analysis process on the received semantic analysis result. Moreover, the response generation server 101 transmits the response obtained from the response generation process to the relay server 51.

In step S34, the relay server 51 receives the response transmitted from the response generation server 101 and transmits the response to the voice synthesis server 102.

The voice synthesis server 102 receives the response transmitted from the relay server 51 and performs the voice synthesis process on the received response. Moreover, the voice synthesis server 102 transmits the synthetic sound data obtained from the voice synthesis process to the relay server 51.

In step S35, the relay server 51 receives the synthetic sound data transmitted from the voice synthesis server 102 and transmits the synthetic sound data to the client 21.

The client 21 receives the synthetic sound data from the relay server 51 and outputs synthetic sound corresponding to the synthetic sound data, that is, synthetic sound of the response to the utterance of the user of the client 21 from a speaker and the like that are not illustrated.

As described above, in the voice interaction system 91, the relay server 51 relays communication with each of the voice recognition server 31, the semantic analysis server 32, the response generation server 101, and the voice synthesis server 102 that are four individual service providing servers, and the client 21 transmits voice data to the relay server 51. This enables the client 21 to acquire the synthetic sound data of the response to the utterance.

As a result, it is possible to improve response speed of the voice interaction system 91, and implementation of the client 21 is simplified.

<Use Example 3 of Relay Server>

FIG. 10 is a diagram illustrating a configuration example of a voice schedule management system using the information processing system 41 in FIG. 2.

It should be noted that, throughout the drawings, the same reference numerals are given to portions corresponding to FIG. 8 and the description thereof is omitted as appropriate below.

A voice schedule management system 111 includes the client 21, the voice recognition server 31, the semantic analysis server 32, the relay server 51, a weather information providing server 121, and a schedule management server 122.

Therefore, the voice schedule management system 111 in FIG. 10 is common to the voice interaction system 91 in FIG. 8 in that the client 21, the voice recognition server 31, the semantic analysis server 32, and the relay server 51 are included. However, the voice schedule management system 111 is different from the voice interaction system 91 in that the response generation server 101 and the voice synthesis server 102 are not provided, but the weather information providing server 121 and the schedule management server 122 that provide services different from those of the response generation server 101 and the voice synthesis server 102 are newly provided.

In the voice schedule management system 111, the voice recognition server 31, the semantic analysis server 32, the relay server 51, the weather information providing server 121, and the schedule management server 122 are configured on the cloud.

In the voice schedule management system 111 in FIG. 10, similarly to a case of FIG. 8, the client 21 transmits voice data of an utterance of the user of the client 21 in accordance with the utterance to the relay server 51, and additionally receives a plan registration result transmitted from the relay server 51.

In FIG. 10, similarly to a case of FIG. 8, the relay server 51 communicates with each of the client 21, the voice recognition server 31, and the semantic analysis server 32, and additionally communicates with each of the weather information providing server 121 and the schedule management server 122.

The relay server 51 generates a weather request for requesting confirmation of the weather as data according to the semantic analysis result received from the semantic analysis server 32 and transmits the weather request to the weather information providing server 121. Moreover, the relay server 51 receives a weather confirmation result from the weather information providing server 121.

Furthermore, the relay server 51 generates plan information that requests to register a plan as data according to the semantic analysis result received from the semantic analysis server 32 and transmits the generated plan information to the schedule management server 122. Moreover, the relay server 51 receives the plan registration result from the schedule management server 122 and transmits the plan registration result to the client 21.

The weather information providing server 121 corresponds to a service providing server that provides a service similarly to the voice recognition server 31 or the semantic analysis server 32. The weather information providing server 121 receives the weather request transmitted from the relay server 51 and performs a weather confirmation process on the weather request as a service process corresponding to the service provided by the weather information providing server 121. The weather confirmation process confirms the weather (forecast).

The weather information providing server 121 transmits the weather confirmation result for the weather request to the relay server 51. The weather confirmation result is obtained by performing the weather confirmation process. In the weather confirmation process, the weather (forecast) at a place and at a date and time designated by the weather request is confirmed.

The schedule management server 122 corresponds to a service providing server that provides a service similarly to the voice recognition server 31 or the semantic analysis server 32. The schedule management server 122 receives the plan information transmitted from the relay server 51 and performs a plan registration process that registers a plan on the plan information as a service process corresponding to the service provided by the schedule management server 122.

The schedule management server 122 transmits the plan registration result with respect to the plan information obtained by performing the plan registration process to the relay server 51. In the plan registration process, a plan represented by the plan information is registered in an electronic schedule book.

<Process of Voice Schedule Management System>

Next, a process executed in the voice schedule management system 111 is described with reference to FIG. 11.

FIG. 11 is a flowchart describing a process performed by the relay server 51 in the voice schedule management system 111.

For example, in the voice schedule management system 111, when the user of the client 21 utters, the client 21 transmits voice data of the utterance to the relay server 51.

The following describes the process of the relay server 51 as using, for example, a case where the user of the client 21 utters "I want to go to the amusement park if it is fine this weekend" as an example.

In step S41, the relay server 51 receives voice data of the utterance "I want to go to the amusement park if it is fine this weekend" transmitted from the client 21 and transmits the voice data to the voice recognition server 31.

The voice recognition server 31 performs the voice recognition process on the voice data of the utterance "I want to go to the amusement park if it is fine this weekend" transmitted from the relay server 51 and transmits the voice recognition result "I want to go to the amusement park if it is fine this weekend" obtained from the voice recognition process to the relay server 51.

In step S42, the relay server 51 receives the voice recognition result "I want to go to the amusement park if it is fine this weekend" transmitted from the voice recognition server 31 and transmits the received voice recognition result to the semantic analysis server 32.

The semantic analysis server 32 receives the voice recognition result "I want to go to the amusement park if it is fine this weekend" transmitted from the relay server 51 and performs the semantic analysis process on the voice recognition result "I want to go to the amusement park if it is fine this weekend". Then, the semantic analysis server 32 transmits a semantic analysis result obtained from the semantic analysis process on "I want to go to the amusement park if it is fine this weekend" to the relay server 51.

In step S43, the relay server 51 receives the semantic analysis result of "I want to go to the amusement park if it is fine this weekend" transmitted from the semantic analysis server 32.

In step S44, the relay server 51 generates a weather request for requesting the weather of the amusement park on the weekend as data according to the semantic analysis result of "I want to go to the amusement park if it is fine this weekend" received from the semantic analysis server 32 and transmits the generated weather request to the weather information providing server 121.

The weather information providing server 121 receives the weather request transmitted from the relay server 51 and performs the weather confirmation process that confirms the weather of the amusement park on the weekend designated by the weather request. Then, the weather information providing server 121 transmits a weather confirmation result obtained from the weather confirmation process to the relay server 51.

In step S44, after transmitting the weather request, the relay server 51 receives the weather confirmation result transmitted from the weather information providing server 121 as described above.

In step S45, in a case where the weather confirmation result from the weather information providing server 121 satisfies a condition "if it is fine this weekend" in the semantic analysis result of "I want to go to the amusement park this weekend if it is fine", the relay server 51 generates plan information for requesting registration of "go to the amusement park" that is the plan in the semantic analysis result of "I want to go to the amusement park if it is fine this weekend".

Moreover, in step S45, the relay server 51 transmits the plan information to the schedule management server 122 as data according to the semantic analysis result of "I want to go to the amusement park if it is fine this weekend".

The schedule management server 122 receives the plan information transmitted from the relay server 51 and performs the plan registration process that registers the plan of "go to the amusement park" in the schedule book in accordance with the plan information. Then, the schedule management server 122 transmits the plan registration result obtained from the plan registration process to the relay server 51. The plan registration result represents content of the plan registered in the schedule book and whether or not the plan registration process is normally completed.

In step S45, after transmitting the plan information, the relay server 51 receives the plan registration result transmitted from the schedule management server 122 as described above. The relay server 51 transmits the plan registration result from the schedule management server 122 to the client 21.

The client 21 receives the plan registration result from the relay server 51 and displays the plan registration result on a monitor that is not illustrated.

As described above, in the voice schedule management system 111, the relay server 51 relays communication with each of the voice recognition server 31, the semantic analysis server 32, the weather information providing server 121, and the schedule management server 122 that are four individual service providing servers, and the client 21 transmits voice data to the relay server 51. This enables the client 21 to acquire the plan registration result of the response to the utterance.

As a result, it is possible to improve response speed of the voice schedule management system 111, and implementation of the client 21 is simplified.

<Use Example 4 of Relay Server>

FIG. 12 is a diagram illustrating a configuration example of a content providing system using the information processing system 41 in FIG. 2.

A content providing system 131 includes the client 21, the relay server 51, and servers 141 and 142.

In the content providing system 131, the relay server 51, and the servers 141 and 142 are configured on the cloud.

In the content providing system 131 in FIG. 12, the client 21 transmits account information such as an ID and a password inputted by the user of the client 21 necessary for logging on the server 141 (receiving a service of the server 141) to the relay server 51. Furthermore, the client 21 receives content transmitted from the relay server 51.

The relay server 51 receives the account information transmitted from the client 21 and transmits the account information to the server 141. Furthermore, the relay server 51 receives a token transmitted from the server 141 and transmits the token to the server 142. Moreover, the relay server 51 receives the content transmitted from the server 142 and transmits the content to the client 21.

The server (site) 141 corresponds to the service providing server that provides a service. The server 141 performs an authentication process that performs authentication by using the account information for the server 141 for logging on the server 141. In a case where the authentication results in success, the server 141 permits access to (resources of) the server 141. The server 141 performs the authentication process and permits the access to the server 141 as service processes corresponding to the service provided by the server 141.

In a case where the account information is transmitted from the relay server 51, the server 141 receives the account information from the relay server 51 and performs the authentication process using the account information as a portion of the service processes. Then, in a case where the authentication process using the account information from the relay server 51 results in success, the server 141 transmits a token representing the success of the authentication process to the relay server 51 as a process result obtained from the authentication process performed on the account information.

The server (site) 142 corresponds to the service providing server that provides a service. Similarly to the server 141, the server 142 performs an authentication process using the account information for the server 142 for logging on the server 142. In a case where the authentication results in success, the server 142 permits access to (resources of) the server 142. The server 142 performs the authentication process and permits the access to 142 as service processes corresponding to the service provided by the server 142. By permitting the access, the server 142, for example, provides (transmits) content.

In a case where the token is transmitted from the relay server 51, the server 142 receives the token from the relay server 51 and performs a confirmation process that confirms the success of the authentication process by the server 141 as a portion of the service processes in accordance with the token. Then, the server 142 transmits predetermined content to the relay server 51 as a process result obtained from the confirmation process performed on the token.

<Process of Content Providing System>

Next, a process performed in the content providing system 131 is described with reference to FIG. 13.

FIG. 13 is a flowchart describing a process performed by the relay server 51 in the content providing system 131.

For example, in the server 142, the client 21 accesses the relay server 51 in accordance with a user's operation and transmits the account information of the user of the client 21 regarding the server 141 to the relay server 51 via a network, for example, the Internet and the like.

In step S51, the relay server 51 receives the account information transmitted from the client 21 and transmits the account information to the server 141.

The server 141 receives the account information transmitted from the relay server 51 and performs the authentication process on the account information. Moreover, when the authentication process results in success, the server 141 transmits the token to the relay server 51 as a processing result obtained from the authentication process performed on the account information.

In step S52, the relay server 51 receives a token transmitted from the server 141 and transmits the token to the server 142.

The server 142 receives the token transmitted from the relay server 51, performs the confirmation process that confirms the success of the authentication process by the server 141 in accordance with the token, and transmits predetermined content to the relay server 51 as a confirmation result obtained from the confirmation process performed on the token. It is possible to designate content to be the predetermined content, for example, by operating the client 21 by the user of the client 21.

In step S53, the relay server 51 receives the content transmitted from the server 142 and transmits the content to the client 21.

As described above, in the content providing system 131, it is possible for the client 21 to receive the provision of the content serving as the provision of the service of the server 142 that is a service providing server different from the server 141 by using the account information regarding the server 141. In other words, it is possible for the client 21 to access the server 142 by using the account information with respect to the server 141.

It should be noted that, a step of describing a program to be recorded in a storage medium naturally includes not only processes chronologically performed in the described order, but also processes executed in parallel or individually in this specification even though the processes are not necessarily performed chronologically.

Furthermore, a system represents an entire apparatus including a plurality of devices in this specification.

<Others>

The present technology may also be configured as below.

(1)

An information processing device including a communication controller that performs communication control for receiving transmission data transmitted from a client that transmits the transmission data, transmitting the transmission data to a first service providing server that performs a first service process corresponding to a first service, receiving a first service process result from the first service providing server, the first service process result being obtained by performing the first service process on the transmission data, transmitting data according to the first service process result to a second service providing server that performs a second service process corresponding to a second service that is different from the first service, receiving a second service process result from the second service providing server, the second service process result being obtained by performing the second service process on the data according to the first service process result, and transmitting the second service process result to the client.

(2)

The information processing device according to (1), in which the client transmits voice data as the transmission data, the first service providing server includes a voice recognition server that performs a voice recognition process that recognizes voice as the first service process, the second service providing server includes a semantic analysis server that performs a semantic analysis process that analyzes a meaning and content of a character string as the second service process, and the communication controller performs communication control for receiving the voice data transmitted from the client, transmitting the voice data to the voice recognition server, receiving a voice recognition result from the voice recognition server, the voice recognition result being obtained by performing the voice recognition process on the voice data, transmitting the voice recognition result to the semantic analysis server, receiving a semantic analysis result from the semantic analysis server, the semantic analysis result being obtained by performing the semantic analysis process on the voice recognition result, and transmitting the semantic analysis result to the client.

(3)

The information processing device according to (2), in which the client further transmits auxiliary information that assists the voice recognition process or the semantic analysis process, and the communication controller performs communication control for further receiving the auxiliary information from the client, and transmitting the auxiliary information to the voice recognition server or the semantic analysis server.

(4)

The information processing device according to (2) or (3), in which the communication controller performs communication control for transmitting the voice recognition result to the client while receiving voice data from the client.

(5)

The information processing device according to any of (2) to (4), in which the communication controller performs communication control for transmitting the semantic analysis result to a response generation server that performs a generation process that generates a response in an interaction, receiving the response from the response generation server, the response being obtained by performing the generation process on the semantic analysis result, transmitting the response to a voice synthesis server that performs a voice synthesis process that generates synthetic sound data, receiving the synthetic sound data from the voice synthesis server, the synthetic sound data being obtained by performing the voice synthesis process on the response, and transmitting the synthetic sound data to the client.

(6)

An information processing method including a communication control step of performing communication control for receiving transmission data transmitted from a client that transmits the transmission data, transmitting the transmission data to a first service providing server that performs a first service process corresponding to a first service, receiving a first service process result from the first service providing server, the first service process result being obtained by performing the first service process on the transmission data, transmitting data according to the first service process result to a second service providing server that performs a second service process corresponding to a second service that is different from the first service, receiving a second service process result from the second service providing server, the second service process result being obtained by performing the second service process on the data according to the first service process result, and transmitting the second service process result to the client.

(7)

A program for causing a computer to execute a process including a communication control step of performing communication control for receiving transmission data transmitted from a client that transmits the transmission data, transmitting the transmission data to a first service providing server that performs a first service process corresponding to a first service, receiving a first service process result from the first service providing server, the first service process result being obtained by performing the first service process on the transmission data, transmitting data according to the first service process result to a second service providing server that performs a second service process corresponding to a second service that is different from the first service, receiving a second service process result from the second service providing server, the second service process result being obtained by performing the second service process on the data according to the first service process result, and transmitting the second service process result to the client.

REFERENCE SIGNS LIST

11 Voice interaction system, 21 Client, 31 Voice recognition server, 32 Semantic analysis server, 41 Information processing system, 51 Relay server, 61-1 First service providing server, 61-2 Second service providing server, 71 Communication controller, 72 Storage, 81 Voice interaction system, 91 Voice interaction system, 101 Response generation server, 102 Voice synthesis server, 111 Voice schedule management system, 121 Weather information providing server, 122 Schedule management server, 131 Content providing system, 141 Server, 142 Server

The invention claimed is:

1. An information processing device, comprising:
a communication controller configured to:
  control reception of transmission data transmitted from a client, wherein the transmission data is voice data;
  control transmission of the voice data to a first service providing server that performs a first service process corresponding to a first service, wherein the first service providing server performs a voice recognition process to recognize voice as the first service process;
  control reception of a first service process result from the first service providing server, wherein
  the first service process result is a voice recognition result, and
  the voice recognition result is obtained based on the voice recognition process performed on the voice data;
  control transmission of the voice recognition result to a second service providing server, wherein
  the second service providing server performs a second service process corresponding to a second service,
  the second service is different from the first service, and
  the second service providing server performs a semantic analysis process to analyze a meaning and content of a character string as the second service process;
  control reception of a second service process result from the second service providing server, wherein
  the second service process result is a semantic analysis result, and
  the semantic analysis result is obtained based on the semantic analysis process performed on the voice recognition result;
  control transmission of the semantic analysis result to a response generation server that performs a generation process to generate a response in an interaction;
  control reception of the response from the response generation server, wherein the response is obtained based on the generation process performed on the semantic analysis result;
  control transmission of the response to a voice synthesis server that performs a voice synthesis process to generate synthetic sound data;
  control reception of the synthetic sound data from the voice synthesis server, wherein the synthetic sound data is obtained based on the voice synthesis process performed on the response; and
  control transmission of the synthetic sound data to the client.

2. The information processing device according to claim 1, wherein
  the first service providing server includes a voice recognition server that performs the voice recognition process to recognize the voice as the first service process, and
  the second service providing server includes a semantic analysis server that performs the semantic analysis process to analyze the meaning and content of the character string as the second service process.

3. The information processing device according to claim 2, wherein the communication controller is further configured to:
  control reception of auxiliary information from the client, wherein the auxiliary information assists the voice recognition process or the semantic analysis process; and
  control transmission of the auxiliary information to the voice recognition server or the semantic analysis server.

4. The information processing device according to claim 1, wherein the communication controller is further configured to control transmission of the voice recognition result to the client based on the voice data received from the client.

5. An information processing method, comprising:
  receiving transmission data transmitted from a client, wherein the transmission data is voice data;
  transmitting the voice data to a first service providing server that performs a first service process corresponding to a first service, wherein the first service providing server performs a voice recognition process to recognize voice as the first service process;
  receiving a first service process result from the first service providing server, wherein
  the first service process result is a voice recognition result, and
  the voice recognition result is obtained based on the voice recognition process performed on the voice data;
  transmitting the voice recognition result to a second service providing server, wherein
  the second service providing server performs a second service process corresponding to a second service,
  the second service is different from the first service, and
  the second service providing server performs a semantic analysis process to analyze a meaning and content of a character string as the second service process;
  receiving a second service process result from the second service providing server, wherein
  the second service process result is a semantic analysis result, and
  the semantic analysis result obtained based on the semantic analysis process performed on the voice recognition result;
  transmitting the semantic analysis result to a response generation server that performs a generation process to generate a response in an interaction;
  receiving the response from the response generation server, wherein the response is obtained based on the generation process performed on the semantic analysis result;
  transmitting the response to a voice synthesis server that performs a voice synthesis process to generate synthetic sound data;
  receiving the synthetic sound data from the voice synthesis server, wherein the synthetic sound data is obtained based on the voice synthesis process performed on the response; and
  transmitting the synthetic sound data to the client.

6. A non-transitory computer-readable medium having stored thereon computer-executable instructions, that when executed by a processor, cause the processor to execute operations, the operations comprising:
  receiving transmission data transmitted from a client, wherein the transmission data is voice data;
  transmitting the voice data to a first service providing server that performs a first service process corresponding to a first service, wherein the first service providing server performs a voice recognition process to recognize voice as the first service process;
receiving a first service process result from the first service providing server, wherein
the first service process result is a voice recognition result, and
the voice recognition result is obtained based on the voice recognition process performed on the voice data;
transmitting the voice recognition result to a second service providing server, wherein
the second service providing server performs a second service process corresponding to a second service,
the second service is different from the first service, and
the second service providing server performs a semantic analysis process to analyze a meaning and content of a character string as the second service process;
receiving a second service process result from the second service providing server, wherein
the second service process result is a semantic analysis result, and
the semantic analysis result is obtained based on the semantic analysis process performed on the voice recognition result;
transmitting the semantic analysis result to a response generation server that performs a generation process to generate a response in an interaction;
receiving the response from the response generation server, wherein the response is obtained based on the generation process performed on the semantic analysis result;
transmitting the response to a voice synthesis server that performs a voice synthesis process to generate synthetic sound data;
receiving the synthetic sound data from the voice synthesis server, wherein the synthetic sound data is obtained based on the voice synthesis process performed on the response; and
transmitting the synthetic sound data to the client.

* * * * *